(No Model.)
J. J. PHILLIPS.
MEANS FOR CLEANING AND DRYING NUTS, &c.
No. 410,018. Patented Aug. 27, 1889.
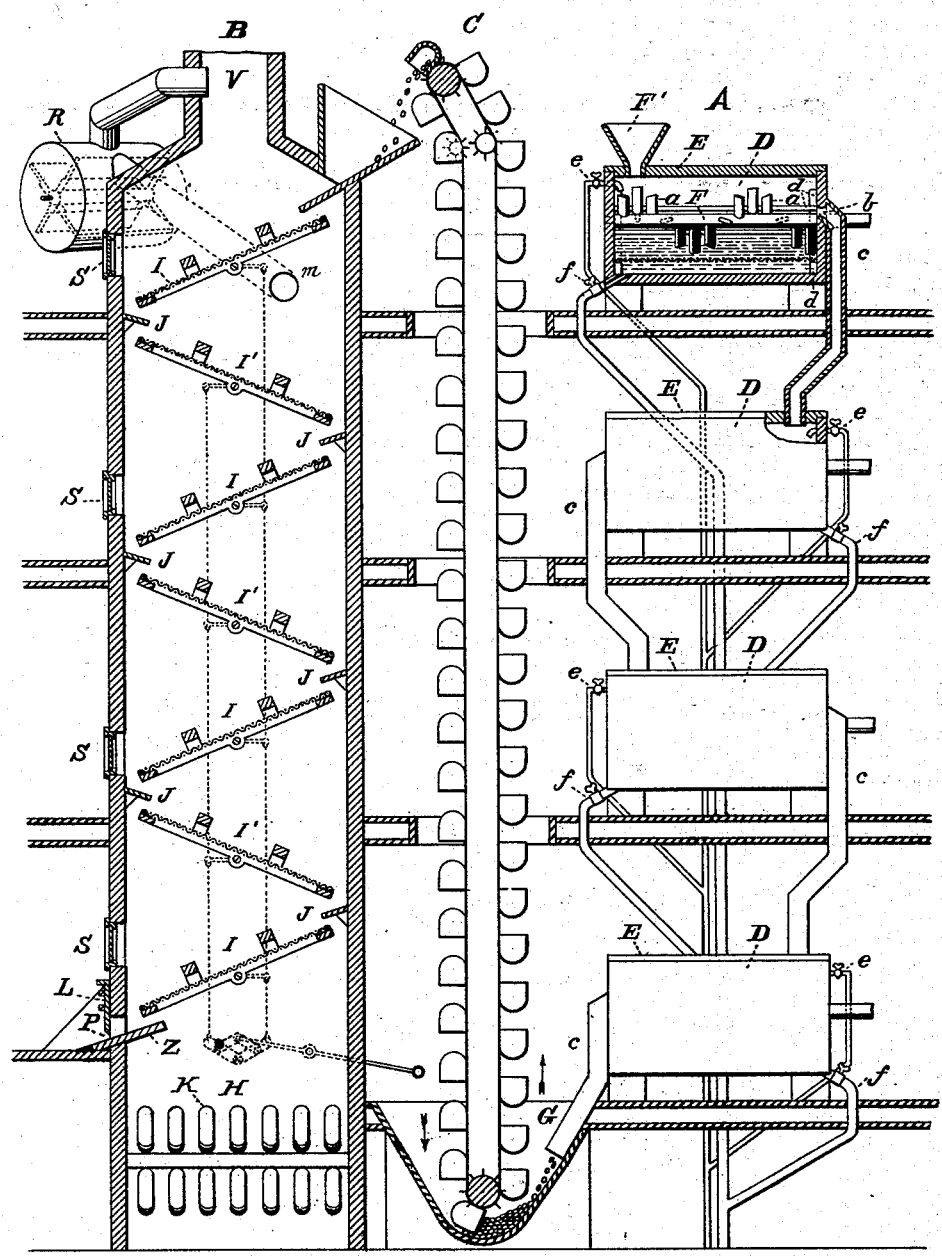
WITNESSES
Villette Anderson,
Mary Boykin.
INVENTOR
J. J. Phillips,
by E. W. Anderson,
Attorney

UNITED STATES PATENT OFFICE.

JAMES J. PHILLIPS, OF NORFOLK, VIRGINIA.

MEANS FOR CLEANING AND DRYING NUTS, &c.

SPECIFICATION forming part of Letters Patent No. 410,018, dated August 27, 1889.

Application filed March 26, 1889. Serial No. 304,832. (No model.)

*To all whom it may concern:*

Be it known that I, JAMES J. PHILLIPS, a citizen of the United States, and a resident of Norfolk, in the county of Norfolk and State of Virginia, have invented certain new and useful Improvements in Means for Cleaning and Drying Nuts, &c.; and I do declare the following to be a full, clear, and exact description of the invention, such as will enable others skilled in the art to which it appertains to make and use the same, reference being had to the accompanying drawing, and to letters or figures of reference marked thereon, which form a part of this specification.

The drawing is a representation of this invention, and shows a vertical section.

This invention has relation to apparatus for cleaning and drying nuts and other articles; and it consists in the construction and novel combination of devices, as hereinafter set forth.

In the accompanying drawings, the letter A designates the cleaning apparatus, (made the subject of an application, Serial No. 290,587, filed November 12, 1888,) consisting of a vertical series of tanks wherein the nuts are chemically bathed and washed; B, the drying-flue, and C the elevator whereby the nuts are raised from the delivery chute or receptacle of the bottom tank to the hopper of the drying-flue.

The combination of devices constituting this invention is designed to be constructed in a factory, several stories in height, the descent by gravitation being required in the automatic delivery from one tank to the next below, in series, and in the cleaning-flue to secure the full benefit of the mode of drying.

The vertical series of tanks D D is preferably constructed in such a manner that the tanks will rest one on each floor of the factory, four floors being required. Each tank D is provided with a close cover E, and with a rotary stirrer F, consisting of a shaft extending longitudinally in the tank and provided with oblique blades $a$. In the end of the tank just above the water-level is provided the discharge-opening $b$, leading into the chute $c$, which descends to the tank next below, entering the same through the close lid or covering thereof.

Each tank is provided with a concave false bottom $d$, which may be made in sections so as to be easily removed for cleaning. A water-supply is required, as at $e$, and a waste, as at $f$, to draw off the grime and sedimentary matters which are taken from the shells of the nuts in the cleaning operation. The upper tank has a hopper F', wherein the nuts are fed to said tank, which contains water either cold or warm and somewhat alkaline, this bath being designed to remove the gross dirt and greasy matters adhering to the shells. The nuts are carried through this bath, being moved around therein, and gradually propelled by the oblique blades of the stirrer toward the discharging end of the tank, through the opening in which, as they are lifted and massed by the last blade, they pass into the chute which conveys them into the next tank below, which is provided with a bath of water impregnated with chlorine gas. This tank is provided with mechanical appliances similar to that above described in connection with the first tank, and by their means the nuts are moved about in the bath and finally discharged at the end thereof into the chute leading to the tank next below, which is similarly appointed and is provided with a bath consisting of a weak solution of acetic acid. On being discharged from this tank the nuts pass by the chute into the lowest tank in which is a bath of slightly-alkaline water. This tank is also provided with a stirrer, whereby the nuts are moved about and along the bath, and are finally discharged into a receiver G, whence they are taken by the buckets of the elevator C upward to the top portion of the building and are discharged into the hopper of the drying-flue B. In these baths or washings the nut is first relieved of the coarser particles of soil and grease which adhere to it, and next is washed in the chlorine bath to attack the fungi and mildew, removing the vegetable stains arising from contact with damaged vines, straw, &c., and in order to stop the action of the chlorine bath at this point and avoid its bleaching and corrosive effects the nuts are discharged therefrom into the bath of acetic-acid solution, which not only eliminates all traces of the chlorine, but also actively assists in the destruction of mildew and in removing musty odors. Thence the nuts pass to the last bath of alkaline water to remove all traces of the acetic acid, and are then perfectly clean, inodorous, and of a pure natural color.

To prevent the nuts from again acquiring mildew, they are at once dried by their passage downward through the flue B. This flue extends downward from the upper portion of the building through openings in its several floors and terminates below in a base H, in which is a heater K, preferably a coil of pipe through which steam is passing. The draft through the base is sufficient to provide a current of hot air rising through the flue. In the flue are a series of perforated planes I, inclined alternately in opposite directions, over which the nuts pass in a spread-out manner. Near the lower end of each plane is an inclined ledge J, attached to the wall of the flue and designed to receive the nuts as they leave the plane and deliver them in reversed position to the upper portion of the plane next below. These inclined planes are adjustable in order that the speed of the movement of the nuts may be regulated.

As considerable vapor is developed in the upper portion of the flue, an opening $m$ is provided in this part, and a pipe connects the opening with an exhaust-fan R, whereby the steam is drawn out of the flue. To assist the draft, the exhaust may discharge into the upper flue V of the drier.

To facilitate inspection of the interior of the flue, sights S are required opposite the inclined planes.

The lower inclined plane of the flue delivers the nuts upon a guide-board or discharging-plane Z, over which they pass out upon a receiver through the transverse opening P. This opening is provided with an adjustable curtain or slide L, whereby the discharge of the nuts, as well as their movement downward through the flue, is regulated.

Having described this invention, what I claim, and desire to secure by Letters Patent, is—

The apparatus for treating nuts, &c., which comprises the series of baths having elevated discharge-openings and oblique stirring and discharging blades, the connecting-chutes arranged at successively opposite ends of the baths, the water-supply pipes connecting with successively opposite ends of the baths at their upper edges, and the waste-water pipes connecting with successively opposite ends of the baths at their lower edges, substantially as set forth.

In testimony whereof I affix my signature in presence of two witnesses.

JAMES J. PHILLIPS.

Witnesses:
VILLETTE ANDERSON,
MARY BOYKIN.